United States Patent
Teboulle (10) Patent No.: US 12,523,511 B2
(45) Date of Patent: Jan. 13, 2026

(54) METHOD FOR READING QUALIMETRIC DATA AND SYSTEM IMPLEMENTING SAID METHOD

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Bois-Colombes (FR)

(*) Notice: Subject to any disclaimer, the term of this patent is extended or adjusted under 35 U.S.C. 154(b) by 191 days.

(21) Appl. No.: 18/127,920

(22) Filed: Mar. 29, 2023

(65) Prior Publication Data
US 2023/0349744 A1 Nov. 2, 2023

(30) Foreign Application Priority Data

Apr. 28, 2022 (FR) .................................. 2204028

(51) Int. Cl.
*G01F 15/063* (2022.01)
*G06Q 50/06* (2024.01)
*G08C 17/02* (2006.01)

(52) U.S. Cl.
CPC ........... *G01F 15/063* (2013.01); *G06Q 50/06* (2013.01); *G08C 17/02* (2013.01)

(58) Field of Classification Search
None
See application file for complete search history.

(56) References Cited

U.S. PATENT DOCUMENTS

| 5,789,723 A | * | 8/1998 | Hirst | G03G 15/2003 |
| | | | | 219/505 |
| 10,393,793 B1 | * | 8/2019 | Nguyen | G01R 31/088 |
| 11,320,467 B1 | * | 5/2022 | Aljohani | G01R 22/063 |
| 2011/0224935 A1 | | 9/2011 | Hampel et al. | |

(Continued)

FOREIGN PATENT DOCUMENTS

| CN | 105137231 A | 12/2015 |
| CN | 110738839 A | 1/2020 |

(Continued)

OTHER PUBLICATIONS

Mustafa et al., Upgrading smart meters as key compponents of Integated Power Quality Monitoring System (Year: 2016).*

(Continued)

*Primary Examiner* — Curtis A Kuntz
*Assistant Examiner* — Jerold B Murphy
(74) *Attorney, Agent, or Firm* — Williams Mullen; R. Brian Drozd (57) ABSTRACT

A method for reading qualimetric data by a qualimetry device configured for communicating with N meters includes, for each of said N meters: calculating, by said meter, qualimetric data over a time period and timestamping said qualimetric data; sending, by the qualimetry device, a request for qualimetric data to said meter; in response to said request, sending, by said meter, said timestamped qualimetric data to said qualimetry device; and on reception of said timestamped qualimetric data by said qualimetry device, storing said timestamped qualimetric data in memory in association with an identifier of said meter that sent said timestamped qualimetric data.

13 Claims, 4 Drawing Sheets

(56) References Cited

U.S. PATENT DOCUMENTS

| | | | |
|---|---|---|---|
| 2013/0014287 A1* | 1/2013 | Awata | H04L 9/3247 726/30 |
| 2019/0215770 A1* | 7/2019 | Delibie | H04W 4/70 |
| 2022/0224995 A1 | 7/2022 | Teboulle | |

FOREIGN PATENT DOCUMENTS

| FR | 3095568 A1 | 10/2020 |
|---|---|---|
| WO | 2012/104149 A1 | 8/2012 |

OTHER PUBLICATIONS

Nov. 30, 2022 Search Report issued in French Patent Application No. 2204028.

\* cited by examiner

METHOD FOR READING QUALIMETRIC DATA AND SYSTEM IMPLEMENTING SAID METHOD

TECHNICAL FIELD

At least one embodiment relates to a method for reading qualimetric data by a qualimetry device configured for communicating with one or more meters. At least one other embodiment relates to a system implementing said method.

PRIOR ART

Smart meters are known, of the electricity meter type, thermal energy meter type or fluid meter type, e.g. gas or water, which comprise communication interfaces enabling an automated management system to make a remote collection of meter data, e.g. consumption data. For example, these smart meters comprise one (or more) communication interface(s) of the PLC type (the acronym of "powerline communication") and/or of the radio type. They then transmit the meter data by these communication interfaces, e.g. in the form of frames, to transfer these consumption data, at regular intervals or not, to an information system processing them in a centralised manner. These communication data are used by the information system in particular for operations of invoicing the consumer customer by a service provider.

It is moreover known that, in the context of its relationships with its customers and its suppliers, an electricity distributor controls the quality of the electrical energy that it supplies or that is delivered to it. To control this quality, it is necessary to determine any disturbances that the electrical signal might undergo. Overvoltages and voltage dips, flicker, network frequency variations and harmonics are examples of parameters representing such disturbances. EN 61000-4-30 class A defines measurement, time-aggregation, precision and evaluation methods to be applied to each parameter to obtain reliable, reproducible and comparable qualimetric data. Class A is in particular used when precise data are necessary, for example for contractual applications that may require verification of conformity with standards, dispute resolution, etc.

The PQI-D device of GMC Instruments is an example of a class A certified qualimetry device making it possible to make qualimetric-data calculations for the medium- and high-voltage parts of a distribution network. However, such a device, which is expensive, is not adapted for making qualimetric-data calculations in the low part of the distribution network, namely close to the end consumer.

It is desirable to overcome these various drawbacks of the prior art. It is in particular desirable to propose a method for reading qualimetric data that makes it possible to obtain qualimetric data as close as possible to the end consumer with limited extra expenditure.

DISCLOSURE OF THE INVENTION

At least one embodiment relates to a method for reading qualimetric data by a qualimetry device configured for communicating with N meters, N being a positive integer, said method comprising, for each of said N meters:

a) calculating, by said meter, qualimetric data over a time period T and timestamping said qualimetric data;

b) sending, by the qualimetry device, a request for qualimetric data to said meter;

c) in response to said request, sending, by said meter, said timestamped qualimetric data to said qualimetry device; and d) on reception of said timestamped qualimetric data by said qualimetry device, storing said timestamped qualimetric data in memory in association with an identifier of said meter that sent said timestamped qualimetric data.

Advantageously, the method described makes it possible, meter by meter, to know the quality, e.g. the quality of the electrical energy, at the point of supply.

In one embodiment, sending, by said meter, said timestamped qualimetric data to said qualimetry device comprises sending said timestamped qualimetric data while adding thereto a signature, and, on reception of said timestamped qualimetric data by said qualimetry device, storing said qualimetric data in memory in association with an identifier of said meter that sent said timestamped qualimetric data comprises:

authenticating said timestamped qualimetric data from said signature received and from a signature public key associated with said meter; and storing said qualimetric data in memory in association with an identifier of said meter that sent said timestamped qualimetric data in the case of successful authentication.

In one embodiment, said meter is an electricity meter and said qualimetric data comprise a plurality of voltage harmonics, a plurality of current harmonics and a short-duration flicker.

In one embodiment, said steps a) to d) being repeated M times, M being a positive integer, said method comprises calculating a long-duration flicker from said M short-duration flickers received and storing said long-duration flicker with said timestamped qualimetric data received.

In one embodiment, said meter is a water meter and said qualimetric data comprise an averaged downstream pressure, an averaged difference between an upstream pressure and a downstream pressure, an averaged water flow rate and an averaged water temperature.

In one embodiment, said request further comprises a UTC time and a time of next awakening of said meter.

In one embodiment, said qualimetry device communicates with each of said N meters by WM-Bus frames.

At least one embodiment relates to a system comprising N meters, N being a positive integer, and a qualimetry device configured for communicating with said N meters, each of said N meters and said qualimetry device comprising electronic circuitry configured for:

a) calculating qualimetric data, by said meter, over a time period T and timestamping said qualimetric data;

b) sending, by the qualimetry device, a request for qualimetric data to said meter;

c) in response to said request, sending, by said meter, said timestamped qualimetric data to said qualimetry device, d) on reception of said timestamped qualimetric data by said qualimetry device, storing said timestamped qualimetric data in memory in association with an identifier of said meter that sent said timestamped qualimetric data.

The system is configured for implementing the method according to one of the embodiments described previously.

At least one embodiment relates to a method for reading qualimetric data by a qualimetry device configured for communicating with N meters, N being a positive integer, said method comprising the following steps performed by said qualimetry device:
  a) sending a request for qualimetric data to at least one meter from said N meters;
  b) receiving timestamped qualimetric data from said meter; and
  c) storing said timestamped qualimetric data in memory in association with an identifier of said meter that sent said timestamped qualimetric data.

At least one embodiment relates to a method for reading qualimetric data by a qualimetry device configured for communicating with N meters, N being a positive integer, said method comprising the following steps performed by each of said N meters:
  a) calculating, by said meter, qualimetric data over a time period T and timestamping said qualimetric data;
  b) receiving a request for qualimetric data from said qualimetry device; and
  c) sending said timestamped qualimetric data to said qualimetry device.

At least one embodiment relates to a qualimetry device configured for communicating with N meters, N being a positive integer, said qualimetry device comprising electronic circuitry configured for:
  a) sending a request for qualimetric data to at least one meter from said N meters;
  b) receiving timestamped qualimetric data from said meter; and
  c) storing said timestamped qualimetric data in memory in association with an identifier of said meter that sent said timestamped qualimetric data.

At least one embodiment relates to a meter configured for communicating with a qualimetry device, said meter comprising electronic circuitry configured for:
  a) calculating qualimetric data over a time period T and timestamping said qualimetric data;
  b) receiving a request for qualimetric data from said qualimetry device; and
  c) sending said timestamped qualimetric data to said qualimetry device.

At least one embodiment relates to a computer program product comprising instructions for implementing the method for reading qualimetric data according to one of the embodiments described previously, when said program is executed by at least one processor.

At least one embodiment relates to a storage medium storing a computer program comprising instructions for implementing the method for reading qualimetric data according to one of the embodiments described previously when said program is executed by at least one processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
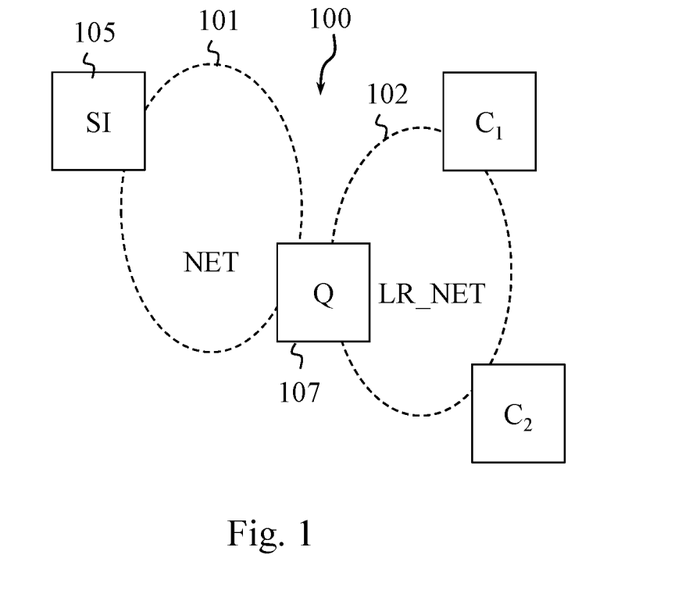
FIG. 1 illustrates schematically a meter-reading system wherein the various embodiments described can be implemented.

FIG. 1 illustrates schematically a meter-reading system 100 wherein the various embodiments described below can be implemented. The meter-reading system 100 is configured for making a reading of meter data, in particular consumption data, from N smart meters $C_i$ with N a positive integer and i an index identifying the particular meter, e.g. $i \in [1; N]$. On FIG. 1, N=2. The smart meters $C_1$ and $C_2$ are for example electricity meters, gas meters, thermal energy meters or water meters or meters for any other fluid type, configured for measuring a consumption by means of metrology software. These smart meters $C_1$ and $C_2$ have the ability to communicate with an information system SI 105 by either radio and/or PLC transmission, or cellular (2G, 3G, 4G or 5G) in the case of electricity meters, or in LoRa or NB-IoT in the case of fluid meters or thermal energy meters. They can communicate with the information system SI 105 either directly or by means of data concentrators, not shown on FIG. 1. The role of the information system SI 105 is in particular to monitor the measurement operations performed by the smart meters $C_1$ et $C_2$.

In the meter-reading system 100, the information system SI 105 also communicates with at least one qualimetry device Q 107 by means of a communication network NET 101, said qualimetry device Q 107 being supplied with electricity by an electricity distribution network or by battery. In particular, the information system SI 105 regularly resets the qualimetry device Q 107 to coordinated universal time (better known by the term UTC) and recovers, from the qualimetry device Q 107, qualimetric data associated with a particular meter from the N meters. For example, the communication network NET 101 is the internet. In other embodiments, the communication network NET 101 is a wireless communication network, for example GPRS (General Packet Radio Service), UMTS (Universal Mobile Telecommunication System), LTE (Long-Term Evolution), NB-IoT (Narrowband Internet of Things), 2G, 3G, 4G or 5G or LoRa (the English acronym of "Long Range").

The qualimetry device Q 107 also communicates with each smart meter $C_1$ and $C_2$ by means of a communication network LR_NET 102. In particular, the qualimetry device Q 107 recovers, from each smart meter to which it is connected, qualimetric data associated with this meter. The communication network LR_NET 102 is a wireless communication network, for example based on the WM-Bus communication standard (NF EN 13757-4, *"Communication systems for meters and remote reading of meters—Part 4: Wireless meter readout (Radio meter reading for operation in SRD bands)"*. However, in variant embodiments, the communication network LR_NET 102 is based on another communication technology, such as another communication standard, such as for example BLE (the English acronym of "Bluetooth Low Energy") or ZigBee.

On FIG. 1, only one qualimetry device Q 107 is shown. However, in another embodiment, the information system SI communicates with a plurality of qualimetry devices by means of the communication network NET 101, each qualimetry device itself being in communication with one or more smart meters. For example, a given qualimetry device is responsible for recovering qualimetric data associated with the smart meters of a building, of a housing estate, of a district or even of a town.

Figure 2:
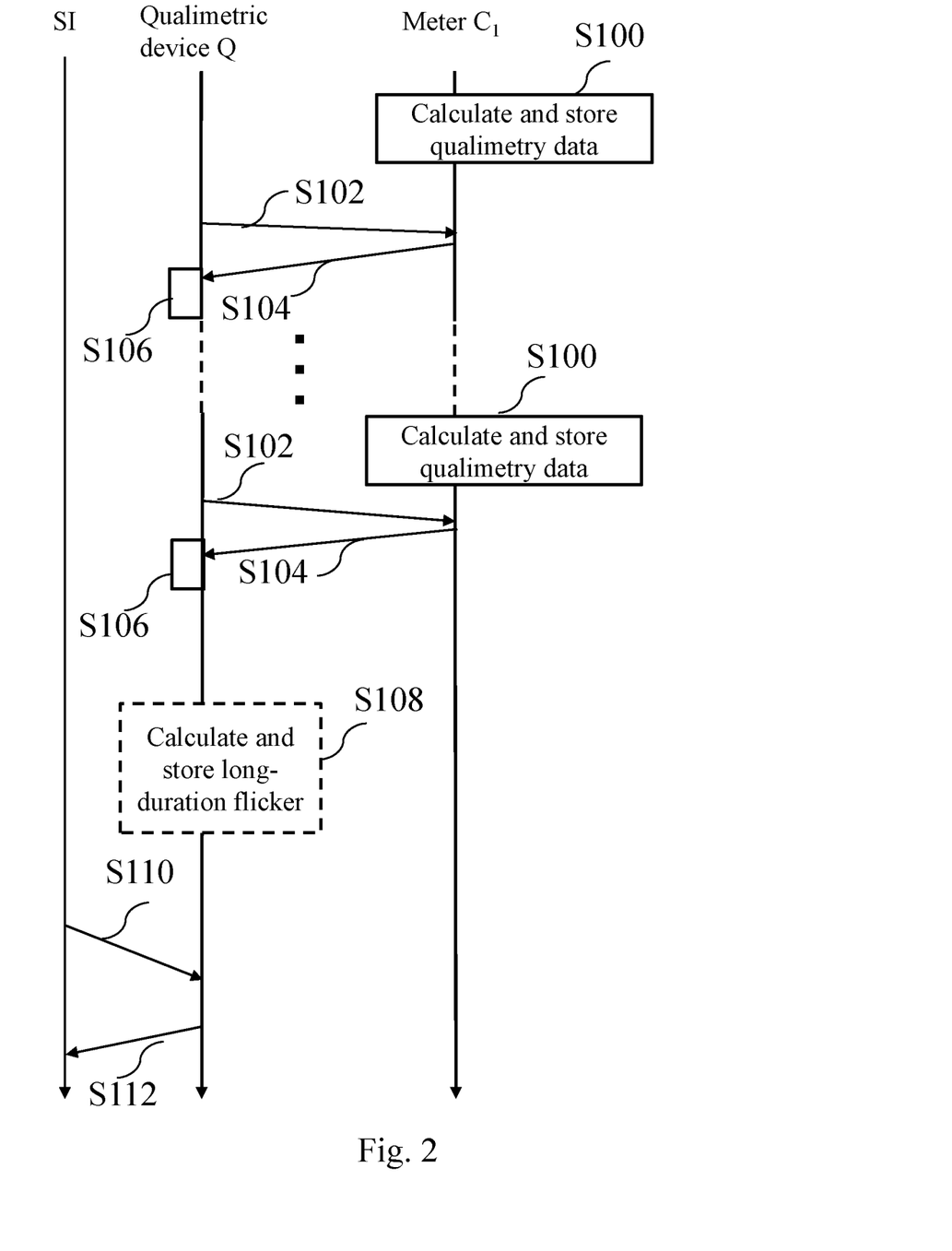
FIG. 2 illustrates schematically a method for reading qualimetric data according to a particular embodiment.

FIG. 2 illustrates schematically a method for reading qualimetric data according to a particular embodiment. On FIG. 2, only one meter C1 is shown to facilitate the description of the method. However, the method applies in a similar manner in the case where the qualimetric device Q communicates with N meters. The qualimetric device Q knows each meter by its serial number that is supplied by the information system.

In a step S100, the meter C1 calculates qualimetric data over a time period T and timestamps them with a time determined according to the UTC time of the meter. The qualimetric data thus calculated and timestamped are stored by the computer C1 in memory. In the case where C1 is an electricity meter, the meter is regularly set to UTC time by the information system SI and, in calculating the qualimetric data, account is for example taken of EN 61000-4-30 Class A. An example of qualimetric data calculated over the time period T is illustrated in table 1 below for a three-phase electrical signal:

TABLE 1

The case of an electricity meter

| | |
|---|---|
| Voltage harmonics of phase 1 | U1 Fundamental |
| | U1 Harmonic 2 |
| | . . . |
| | U1 Harmonic 50 |
| Voltage harmonics of phase 2 | U2 Fundamental |
| | U2 Harmonic 2 |
| | . . . |
| | U2 Harmonic 50 |
| Voltage harmonics of phase 3 | U3 Fundamental |
| | U3 Harmonic 2 |
| | . . . |
| | U3 Harmonic 50 |
| Current harmonics of phase 1 | I1 Fundamental |
| | I1 Harmonic 2 |
| | . . . |
| | I1 Harmonic 50 |
| Current harmonics of phase 2 | I2 Fundamental |
| | I2 Harmonic 2 |
| | . . . |
| | I2 Harmonic 50 |
| Current harmonics of phase 3 | I3 Fundamental |
| | I3 Harmonic 2 |
| | . . . |
| | I3 Harmonic 50 |
| Short-duration flicker for each of the 3 phases | Flicker Pst (phase 1) |
| | Flicker Pst (phase 2) |
| | Flicker Pst (phase 3) |
| Timestamp | UTC time of the data |

In this example, over a time interval T, e.g. T=10 minutes, the meter C1 calculates, for each phase, 50 voltage harmonics and 50 current harmonics. Naturally, the method is not limited to the case of 50 harmonics. Thus more than 50 or less than 50 harmonics can be calculated. For each phase, a short-duration flicker, denoted Pst, is also calculated. These data are timestamped with the UTC time corresponding to the start or to the end of the calculation interval. The embodiment described for a three-phase electrical signal applies in a similar manner to a single-phase electrical signal. In this case, the data (voltage and current harmonics as well as short-duration flicker) are calculated for just one phase. The calculations of the data mentioned in the table above are made as described in EN 61000-4-30 Class A.

Thus, in a particular example embodiment, the meter C1 effects an FFT (the English acronym of "Fast Fourier Transform") on the electrical signal over a given time period Δt, e.g. Δt=200 ms, which corresponds to 10 periods of 20 ms in 50 Hz (12 periods of 20 ms in 60 Hz), in order to calculate the 50 voltage and current harmonics, and the short-duration flicker over this period Δt. Then the meter C1 aggregates, for each parameter of the table, over an interval of 150 periods (180 periods in 60 Hz) the results previously calculated over 15 periods Δt (18 periods in 60 Hz). The aggregations are calculated by calculating quadratic means, i.e. by calculating the square root of the arithmetic mean of the square of the input values. The meter C1 re-calculates a quadratic mean over 10 minutes for each parameter of the table. The results of these calculations are known in the literature by the terminology "10-minute values". The meter C1 timestamps these qualimetric data calculated with, for example, the start time or the end time of the time interval of 10 minutes. The example described for a time interval of 10 minutes applies in a similar manner to other time interval values T.

In the case where the meter C1 is a water meter, an example of qualimetric data calculated over the time period T is illustrated in table 2 below:

TABLE 2

The case of a water meter

| | |
|---|---|
| Averaged downstream pressure | P |
| Averaged difference between upstream pressure and downstream pressure | ΔP |
| Averaged flow rate | D |
| Averaged temperature of cold water | Tp |
| Timestamp | UTC time of the data |

In this example, over a time interval T, e.g. T=24 h, the meter C1 calculates an averaged downstream pressure, an averaged flow rate, an averaged temperature of the cold water and an averaged difference between an upstream pressure and a downstream pressure. The averaging corresponds for example to a quadratic mean of measurements made every nb minutes, e.g. nb=10 minutes, during the time interval T.

In a step S102, the qualimetry device Q sends a request to the meter C1 to ask it for its qualimetric data calculated over the time interval T elapsed. This request is for example in the form of an uplink WM-Bus frame. In one example embodiment, the payload of the frame comprises, in the case of a water meter, a request byte that indicates precisely which is the request in question, namely a request asking for qualimetric data, 6 bytes for setting to UTC time and 6 bytes indicating the time of the next awakening. In the case of an electricity meter, the payload of the frame comprises a request byte. In the particular case of fluid meters and thermal energy meters, which generally operate on a battery, unlike electricity meters, which are supplied by the mains, the request frame also comprises a new UTC time and a next wake-up time for a future reading of qualimetric data. This is because these meters, which are not supplied permanently, unlike electricity meters, go to sleep again when they are inactive, and hence the need to awaken them.

In response to said request, the meter C1 sends, e.g. in a downlink WM-Bus frame, in a step S104, the timestamped qualimetric data to the qualimetry device Q. Thus, in the case of a three-phase electrical signal, the payload of the frame comprises the data mentioned in table 1 above. In the case of a water meter, the payload of the frame comprises the data mentioned in table 2 above.

Figure 3:
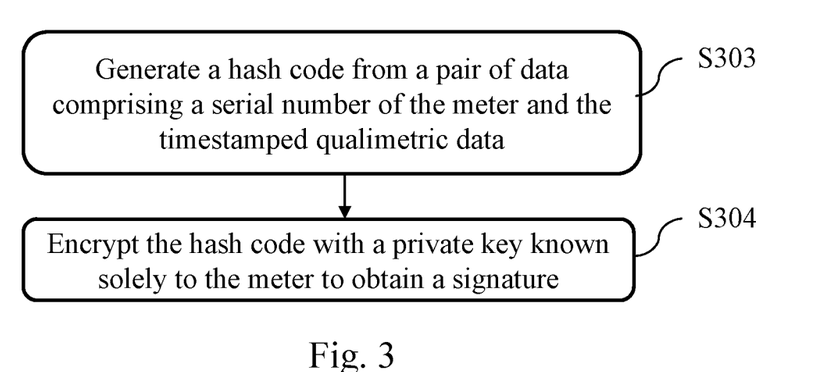
FIG. 3 illustrates in detail the calculation of a signature used for authenticating a meter according to a particular embodiment.

In a particular embodiment, the meter C1 attaches thereto a signature HASH' so that the qualimetry device can authenticate the data received. The signature HASH' is for example calculated, as illustrated by FIG. 3, using a hash function that is applied to the pair formed by the serial number of the meter C1 and timestamped qualimetric data to be transmitted. In a step S106, the qualimetry device Q receives the timestamped qualimetric data and in its turn stores them in memory in association with an identifier of the meter that sent them, e.g. in association with its serial number. In a variant embodiment, the qualimetry device authenticates the data received before storing them. For this purpose, the qualimetry device knows, for each meter, its signature public key. Consequently the qualimetry device Q can authenticate the timestamped qualimetric data received using the public key associated with the meter that is supposed to have sent said qualimetric data. The authentication is more precisely illustrated by FIG. 4. It is only in the case of successful authentication that the qualimetry device Q stores in memory the timestamped qualimetric data received in association with an identifier of the meter that sent them.

As illustrated on FIG. 2, the steps S100 to S106 are repeated at regular time intervals T, e.g. every 10 minutes or every 24 h. More precisely, the meter C1 performs the qualimetric data calculations of table 1 (or respectively of table 2) for each time interval T, and the qualimetry device Q, at the start of each new time interval T, sends a frame requesting qualimetric data. In response, the meter C1 sends the qualimetric data calculated over the time interval T elapsed. Advantageously, the qualimetry device Q waits, e.g. for 5 seconds, after the start of a new time interval T to send its request frame so as to leave time for the meter to finalise the calculations of the qualimetric data.

The data sent by the meter C are for example stored over a sliding time window, e.g. over one week, by the qualimetry device Q.

In an optional step S108, applicable solely in the case where the meter C1 is an electricity meter, the qualimetry device Q calculates, every M (M being a positive integer) receptions of timestamped qualimetric data coming from the meter C1, e.g. M=12, a long-duration flicker. The long-duration flicker, denoted Plt, is calculated from the M short-duration flicker data received using, for example, the mathematical formula defined in section 3.2 of EN 61000-4-15. In the case where T=10 minutes and M=12, this calculation is therefore performed every 2 h. This data is also stored in memory by the qualimetry device Q in association with the other qualimetric data stored for the meter C1, i.e. the voltage and current harmonics and the short-duration flickers.

In the case where the qualimetry device Q collects the qualimetric data from N meters, the steps S100 to S106 are repeated with each meter. More precisely, each meter $C_i$ calculates qualimetric data, timestamps them and stores them in memory, and the qualimetry device Q recovers qualimetric data from each of the N meters. For this purpose, steps S102 to S106 (optionally repeated at regular time intervals T) are applied with each of the N meters. Optionally, in the case of electricity meters, the qualimetry device Q calculates, for each meter Ci, a long-duration flicker every M receptions of timestamped qualimetric data coming from the meter Ci.

At any moment, for example in a step S110, the information system SI can send a request asking of the qualimetry device the qualimetric data of a particular meter Ci, which it identifies for example by its serial number. The qualimetric data stored in memory by the qualimetry device in association with an identifier of the meter Ci are then transmitted, by the qualimetry device, to the information system SI in a step S112. In a variant embodiment, the qualimetry device associates a signature with the qualimetric data transmitted so that the information system SI can authenticate it. The signature is, for example, calculated as illustrated by FIG. 3, the only differences being that the calculations are performed by the qualimetry device rather than by the meter and that the hash function is applied to the pair formed by the serial number of the qualimetry device and qualimetric data of the meter Ci to be transmitted.

The information system SI, when it receives the qualimetric data received by the qualimetry device, can thus authenticate them, i.e. verify that the data do indeed come from the qualimetry device from which they are supposed to come. For this purpose, the information system SI is configured for performing the steps described in relation to FIG. 4, the only differences being that the calculations are performed by the information system SI rather than by the qualimetry device and that the hashcode HASH" is generated from the pair formed by the serial number of the qualimetry device known to the information system and by the qualimetric data of the meter Ci.

FIG. 3 illustrates in detail the calculation of the signature HASH' used for authenticating a meter according to a particular embodiment.

In a step S303, the meter C1 generates a hashcode denoted HASH from a data pair comprising the serial number of the meter and the timestamped qualimetric data, e.g. those mentioned in table 1 or 2. For this purpose, a hash function is used, e.g. a function in the SHA-2 or SHA-3 family. The term hash function H(•) is given to a particular function that, from data supplied as an input, calculates a numerical hashcode serving to quickly identify the initial data. In other words, a unique hashcode, i.e. the result of the hash function, corresponds to a given pair. Consequently, for two different pairs T1 and T2, the meter generates two hashcodes S1=H(T1) and S2=H(T2) where S1 and S2 are different.

In one embodiment, the function H(•) is a function in the SHA-2 or SHA-3 family, e.g. SHA-224, SHA-256, SHA-384 or SHA-512. In the case where the function H(•) is of the SHA-256 type, the hashcode HASH obtained comprises 256 bits. In the case where the function H is of the SHA-512 type, the hashcode HASH obtained comprises 512 bits. Other functions can be used, e.g. an MD4 function, an MD5 function or an SHA-1 function, all well known in the cryptography field, these examples not being limitative. In a variant embodiment, an optional padding step is applied to the data pair in order to obtain an integer number of bytes before applying the hash function H(•).

In a step S304, the meter C1 encrypts the hashcode generated with a private key known solely to the meter C1. The encrypted hashcode is a signature and is denoted HASH'. This private key was previously generated by the meter from its serial number. In a particular embodiment, the private key is generated by applying an "exclusive OR" operator between a random value of P bits particular to the meter and H(serial number), e.g. P=256 and H0 is the SHA-256 function for obtaining a private key of 256 bits. A public key known in particular to the information system SI is associated with this private key. The encryption is an asymmetric encryption, e.g. of the elliptic curve or RSA type. Asymmetric encryption is a technique that uses two encryption keys: a public key and a private key. The public key is shared without restriction whereas the private key is known solely to the meter that generated it. The public key associated with the private key of a meter is in particular known to the qualimetry device Q. Thus the meter C1 uses its private key to encrypt the hashcode HASH in order to obtain a signature HASH' that the destination, in this case the qualimetry device Q, can decrypt with the public key of the meter C1.

Figure 4:
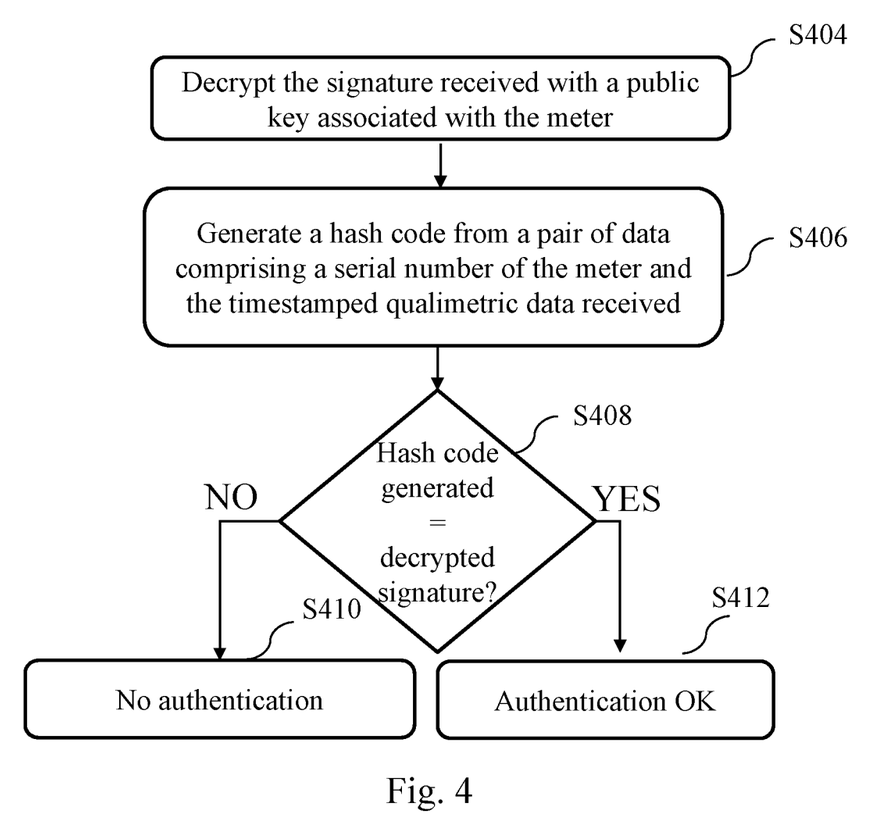
FIG. 4 illustrates a method for authenticating a meter by a qualimetry device according to a particular embodiment.

FIG. 4 illustrates the method for authenticating a meter by the qualimetry device Q according to a particular embodiment.

In a step S404, the qualimetry device Q decrypts said signature HASH' received with a public key associated with the meter identified by its serial number. This is because the qualimetry device Q has available the signature public key of the meter C1, the serial number of which it knows. This public key is used to decrypt the received signature HASH' and thus to obtain a hashcode.

In a step S406, the qualimetry device Q generates a hashcode HASH" from the data pair comprising the serial number of the meter that it knows and the timestamped qualimetric data received. In other words, the qualimetry device Q performs the same operation as the meter C1 at the step S303 with the data that it has available to it, i.e. serial number of the meter and the timestamped qualimetric data received. In particular, the qualimetry device Q uses, at the step S406, the same HASH function as the one used at the step S303 by the meter.

In a step S408, the qualimetry device Q compares the hashcode HASH" generated at the step S406 with the hashcode that is the result of the decryption of the signature HASH' at the step S404. In the case of equality, the qualimetry device Q stores the qualimetric data received. This is because, in the case of equality, the qualimetry device Q is certain that the qualimetric data present in the payload of the frame do indeed come from the correct meter, i.e. from the meter that was supposed to have sent said data. In the case of inequality, the qualimetric data received are not stored in memory and an error message can where applicable be sent to the information system.

Figure 5:
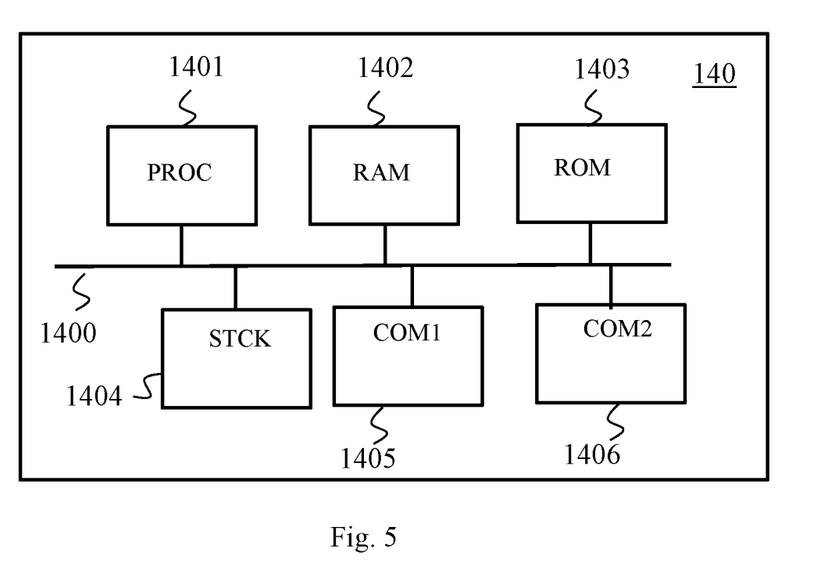
FIG. 5 illustrates schematically an example of hardware architecture of a qualimetry device according to a particular embodiment.

FIG. 5 illustrates schematically an example of hardware architecture of a qualimetry device 140 according to a particular embodiment. According to the example of hardware architecture shown at FIG. 5, the qualimetry device 140 then comprises, connected by a communication bus 1400: a processor or CPU (central processing unit) 1401; a random access memory RAM 1402; a read only memory ROM 1403; a storage unit 1404 such as a hard disk or such as a storage medium reader, e.g. an SD (Secure Digital) card reader; at least one first communication interface 1405 enabling the qualimetry device 140 to send information to the management entity SI and where applicable to receive it, and a second communication interface 1406 enabling the qualimetry device 140 to send or receive information from the meters.

For example, the first communication interface 1405 is in accordance with the LoRa, NB-IoT, GPRS, UMTS, LTE, 2G, 3G, 4G or 5G standard. The second interface is for example in accordance with the WM-Bus, ZigBee or BLE standard.

The processor 1401 is capable of executing instructions loaded in the RAM 1402 from the ROM 1403, from an external memory (not shown), from a storage medium (such as an SD card), or from a communication network. When the qualimetry device 140 is powered up, the processor 1401 is capable of reading instructions from the RAM 1402 and executing them. These instructions form a computer program causing the implementation, by the processor 1401, of all or some of the methods described in relation to FIGS. 2 to 4.

The methods described in relation to FIGS. 2 to 4 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the qualimetry device 140 comprises electronic circuitry configured for implementing the methods described in relation to FIGS. 2 to 4.

Figure 6:
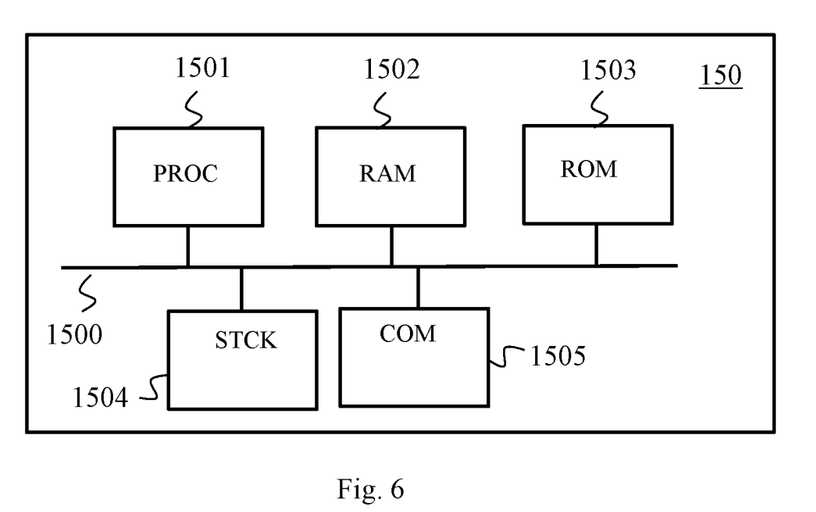
FIG. 6 illustrates schematically an example of hardware architecture of a meter according to a particular embodiment.

FIG. 6 illustrates schematically an example of hardware architecture of a meter 150 according to a particular embodiment. According to the example of hardware architecture shown at FIG. 6, the meter 150 then comprises, connected by a communication bus 1500: a processor or CPU (central processing unit) 1501; a random access memory RAM 1502; a read only memory ROM 1503; a storage unit 1504 such as a hard disk or such as a storage medium reader, e.g. an SD (Secure Digital) card reader; at least one communication interface 1505 enabling the meter 150 to send or receive information from the qualimetry device 140. For example, the communication interface 1505 is in accordance with the WM-Bus, ZigBee or BLE standard. The meter 150 generally comprises another communication interface, not shown on FIG. 5, enabling it to communicate with the information system either directly (by 2G, 3G, 4G or 5G cellular network) or through a data concentrator (typically by PLC or in hybrid mode, i.e. by PLC and radio), for example for reading consumption data.

The processor 1501 is capable of executing instructions loaded in the RAM 1502 from the ROM 1503, from an external memory (not shown), from a storage medium (such as an SD card), or from a communication network. When the meter 150 is powered up, the processor 1501 is capable of reading instructions from the RAM 1502 and executing them. These instructions form a computer program causing the implementation, by the processor 1501, of all or some of the methods described in relation to FIGS. 2 to 4.

The methods described in relation to FIGS. 2 to 4 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the meter 150 comprises electronic circuitry configured for implementing the methods described in relation to FIGS. 2 to 4.

The invention claimed is:

1. A method for reading qualimetric data by a qualimetry device configured for communicating with N meters, N being a positive integer, said method comprising, for each of said N meters:
    calculating, by said meter, qualimetric data over a time period T and timestamping said qualimetric data;
    receiving, by said meter, a request for qualimetric data from said qualimetry device, wherein said request further comprises a UTC time and a time of next awakening of said meter;
    in response to said request, sending, by said meter, said timestamped qualimetric data to said qualimetry device while adding a signature thereto;
    and said method comprising for the qualimetry device:

on reception of said timestamped qualimetric data by said qualimetry device, authenticating said timestamped qualimetric data from said signature received and from a signature public key associated with said meter, and storing said timestamped qualimetric data in memory in association with an identifier of said meter that sent said timestamped qualimetric data in the case of successful authentication.

2. The method according to claim 1, wherein said meter is an electricity meter and said qualimetric data comprise a plurality of voltage harmonics, a plurality of current harmonics and a short-duration flicker.

3. The method according to claim 2, wherein, each of said steps according to claim 1 are repeated M times, M being a positive integer, said method comprises calculating a long-duration flicker from said M short-duration flickers received and storing said long-duration flicker with said timestamped qualimetric data received.

4. The method according to claim 1, wherein said meter is a water meter and said qualimetric data comprise an averaged downstream pressure, an averaged difference between an upstream pressure and a downstream pressure, an averaged water flow rate and an averaged water temperature.

5. The method according to claim 1, wherein said qualimetry device communicates with each of said N meters by WM-Bus frames.

6. A non-transitory storage medium storing a computer program product comprising instructions for performing the steps, implemented by the meter, of the method for reading qualimetric data, according to claim 1, when said program is executed by at least one processor of said meter.

7. A system comprising N meters, N being a positive integer, and a qualimetry device configured for communicating with said N meters, each of said N meters comprising electronic circuitry configured for:
a) calculating qualimetric data, by said meter, over a time period and timestamping said qualimetric data;
b) receiving, by said meter, a request for qualimetric data from the qualimetry device, wherein said request further comprises a UTC time and a time of next awakening of said meter;
c) in response to said request, sending, by said meter, said timestamped qualimetric data to said qualimetry device while adding a signature thereto, and said qualimetry device comprising electronic circuitry configured for:
b) sending a request for qualimetric data to said meter;
d) on reception of said timestamped qualimetric data by said qualimetry device, authenticating said timestamped qualimetric data from said signature received and from a signature public key associated with said meter, and storing said timestamped qualimetric data in memory in association with an identifier of said meter that sent said timestamped timestamped qualimetric data in the case of successful authentication.

8. The system according to claim 7, said system being configured for implementing a method for reading qualimetric data by a qualimetry device configured for communicating with N meters, N being a positive integer, said method comprising, for each of said N meters:
a) a) calculating, by said meter, qualimetric data over a time period and timestamping said qualimetric data;
b) b) receiving, by said meter, the request for qualimetric data from said qualimetry device;
c) c) in response to said request, sending, by said meter, said timestamped qualimetric data to said qualimetry device while adding the signature thereto;
and said method comprising for the qualimetry device:
d) d) on reception of said timestamped qualimetric data by said qualimetry device, authenticating said timestamped qualimetric data from said signature received and from the signature public key associated with said meter, and storing said timestamped qualimetric data in memory in association with an identifier of said meter that sent said timestamped qualimetric data in the case of successful authentication.

9. A method for reading qualimetric data by a qualimetry device configured for communicating with N meters, N being a positive integer, said method comprising the following steps performed by said qualimetry device:
a) sending a request for qualimetric data to at least one meter from said N meters, wherein said request further comprises a UTC time and a time of next awakening of said meter;
b) receiving timestamped qualimetric data from said meter; and
c) authenticating said timestamped qualimetric data from a signature received and from a signature public key associated with said meter, and storing said timestamped qualimetric data in memory in association with an identifier of said meter that sent said timestamped qualimetric data in the case of successful authentication.

10. A method for reading qualimetric data by a qualimetry device configured for communicating with N meters, N being a positive integer, said method comprising the following steps performed by each of said N meters:
a) calculating, by said meter, qualimetric data over a time period and timestamping said qualimetric data;
b) receiving a request for qualimetric data from said qualimetry device, wherein said request further comprises a UTC time and a time of next awakening of said meter; and
c) sending said timestamped qualimetric data to said qualimetry device while adding a signature thereto.

11. A qualimetry device configured for communicating with N meters, N being a positive integer, said qualimetry device comprising electronic circuitry configured for:
a) sending a request for qualimetric data to at least one meter from said N meters, wherein said request further comprises a UTC time and a time of next awakening of said meter:
b) receiving timestamped qualimetric data from said meter; and
c) authenticating said timestamped qualimetric data from a signature received and from a signature public key associated with said meter, and storing said timestamped qualimetric data in memory in association with an identifier of said meter that sent said timestamped qualimetric data in the case of successful authentication.

12. A meter configured for communicating with a qualimetry device, said meter comprising electronic circuitry configured for:
a) calculating qualimetric data over a time period and timestamping said qualimetric data;
b) receiving a request for qualimetric data from said qualimetry device, wherein said request further comprises a UTC time and a time of next awakening of said meter; and
c) sending said timestamped qualimetric data to said qualimetry device while adding a signature thereto.

13. A non-transitory storage medium storing a computer program product comprising instructions for performing the steps, implemented by the qualimetry device, of the method for reading qualimetric data according to claim 1, when said program is executed by at least one processor of said qualimetry device.

\* \* \* \* \*